United States Patent [19]

Peczkowski et al.

[11] Patent Number: 5,333,942
[45] Date of Patent: Aug. 2, 1994

[54] ANTI-SKID BRAKE CONTROL SYSTEM

[75] Inventors: Joseph L. Peczkowski, Granger; Peter J. Suh, South Bend, both of Ind.

[73] Assignee: Allied-Signal Inc., Morristown, N.J.

[21] Appl. No.: 966,219

[22] Filed: Oct. 26, 1992

[51] Int. Cl.$^5$ .............................................. B60T 8/72
[52] U.S. Cl. ........................................ 303/94; 303/97;
303/100; 303/113.4; 364/426.02
[58] Field of Search .................... 303/94, 95, 97, 99,
303/100, 103, 102, 105, 107, 113.4, 113.196,
109, 3, 15, 9.62; 364/426.02

[56] References Cited

U.S. PATENT DOCUMENTS

| | | | |
|---|---|---|---|
| Re 33,486 | 12/1990 | Hirzel et al. | 364/426.02 |
| 3,520,575 | 7/1970 | Steigerwald | 303/21 |
| 4,402,047 | 8/1983 | Newton et al. | 303/100 X |
| 4,414,630 | 11/1983 | Harris et al. | 303/95 X |
| 4,610,484 | 9/1986 | Amberg et al. | 303/100 |
| 4,646,242 | 2/1987 | Valaas | 303/93 |
| 4,683,538 | 7/1987 | Guichard | 303/97 X |
| 4,725,953 | 2/1988 | Rolland et al. | 303/93 |
| 4,760,529 | 7/1988 | Takata et al. | 364/426 |
| 4,773,013 | 9/1988 | Crapanzano et al. | 364/426.02 |
| 4,850,650 | 7/1989 | Eckert et al. | 303/100 X |
| 4,997,236 | 5/1991 | Naito et al. | 303/106 |
| 5,003,481 | 3/1991 | Matsuda | 364/426.02 |
| 5,024,491 | 6/1991 | Pease, Jr. et al. | 303/93 |
| 5,063,514 | 11/1991 | Headley et al. | 364/426.02 |
| 5,065,327 | 11/1991 | Yahagi et al. | 364/426.02 |
| 5,082,333 | 1/1992 | Fukushima et al. | 303/96 |
| 5,136,510 | 8/1992 | Beck | 364/426.01 |

FOREIGN PATENT DOCUMENTS 2172355 9/1986 United Kingdom.

Primary Examiner—Robert J. Oberleitner
Assistant Examiner—Peter M. Poon
Attorney, Agent, or Firm—Larry J. Palguta; Leo H. McCormick, Jr.; Robert A. Walsh

[57] ABSTRACT

An anti-skid brake control system (9) for a wheeled vehicle has a conventional continuous source of pressurized hydraulic fluid, a hydraulically actuated wheel rotation braking device which responds via a wheel brake valve (11) to applied hydraulic pressure to apply a braking force to a wheel of the vehicle, and an operator actuatable control (10, 12, 39) for varying the supply of hydraulic pressure to the wheel rotation braking device. The system is responsive directly to the operator actuatable control (10, 12, 39) for determining the deceleration (14) currently commanded by the operator and further dynamically determines a maximum permissible wheel deceleration (47) at a given time. The operator controlled supply of hydraulic pressure to the braking device is overridden in the event that the deceleration (14) currently commanded by the operator exceeds the maximum permissible wheel deceleration. Maximum permissible wheel deceleration is dynamically determined by measuring the angular velocity (13) of the wheel, calculating the angular deceleration (51) of the wheel from the measured angular velocity (13), determining a maximum angular deceleration value (47) based on the measured angular velocity (13), determining the difference (53) between the calculated angular deceleration and the determined maximum angular deceleration, and modifying the determined maximum angular deceleration by a fraction of the determined difference (55) only if the determined maximum angular deceleration (47) is greater than the calculated angular deceleration (51). The braking force of the vehicle is controlled totally by the operator up to the point of an impending skid.

8 Claims, 2 Drawing Sheets

ANTI-SKID BRAKE CONTROL SYSTEM

SUMMARY OF THE INVENTION

The present invention relates generally to vehicular braking systems and more particularly to vehicular braking systems having anti-skid features.

One problem with prior art anti-skid systems is the lack of direct operator control over the application of braking force. Another problem is a somewhat slower than desired reaction time, i.e., the time required for the braking pressure to rise. Typical prior art anti-skid systems utilize time as the independent parameter (reducing deceleration a time interval after the detection of an incipient skid). Illustrative of this approach are U.S. Pat. Nos. 4,530,059; 4,760,529; 4,997,236; 5,001,640; and 5,072,393. Prior art systems also typically modulate the brake pedal command to generate the wheel speed (brake hydraulic pressure) command resulting in a time lag of operation of the braking system. It is not uncommon in these schemes for the scheduled or desired deceleration to be dynamically varied during braking. For example, in U.S. Pat. No. 4,997,236, an amount of compensation of braking pressure based on wheel speed and wheel deceleration is computed during braking in an attempt to compensate in the time lag of operation of the braking device.

In general, the present invention utilizes directly commanded pressure and wheel deceleration to generate the wheel speed command and utilization of speed as the independent parameter resulting in a more responsive system. The anti-skid brake control system of the present invention has an arrangement which is responsive to the operator actuatable brake control for determining the deceleration currently commanded by the operator along with apparatus for dynamically determining a maximum permissible wheel deceleration at a given time. The commanded deceleration and the maximum permissible wheel deceleration are compared and the lesser in magnitude of the two values is selected. Operator commanded brake pressure is supplied to the vehicle wheel brake in the event that the commanded deceleration is selected while a lesser pressure determined by the maximum permissible wheel deceleration is supplied in the event the maximum permissible vehicle deceleration is selected.

The anti-lock braking system employs depression, by an operator, of a brake control pedal to both directly control the application of hydraulically applied braking force to a wheel and to provide an indication of the commanded wheel deceleration. The motion of a vehicle braked wheel is monitored and the application of a hydraulically applied braking force to the wheel is controlled by measuring the angular velocity of the wheel and calculating the angular deceleration of the wheel from the measured angular velocity. A maximum angular deceleration value based on the measured angular velocity is determined, for example, by a table look-up technique. The difference between the calculated angular deceleration and the determined maximum angular deceleration is next determined and the determined maximum angular deceleration is modified by a fraction of the determined difference only if the determined maximum angular deceleration is greater than the calculated angular deceleration. Finally, the modified determined maximum angular deceleration is utilized if the determined maximum angular deceleration is greater than the calculated angular deceleration; otherwise the determined maximum angular deceleration is utilized, to limit the application of hydraulically applied braking force to the wheel. This final step may include a comparison of the commanded wheel deceleration to one of the determined maximum angular deceleration and modified determined maximum angular deceleration, and a limiting of the actual wheel deceleration to one of the determined maximum angular deceleration and modified maximum angular deceleration in the event the comparison indicates the commanded wheel deceleration is greater, while limiting the actual wheel deceleration to the commanded wheel deceleration in the event the comparison indicates the selected one of the determined maximum angular deceleration and modified determined maximum angular deceleration is greater than the commanded wheel deceleration, so that the braking force of the vehicle is totally controlled by the operator up to the point of an impending skid.

The present invention provides solutions to the above problems by providing in a wheeled vehicle having means for supplying pressurized brake fluid to actuate vehicle wheel brakes of the vehicle, a brake control system for providing anti-skid control comprising:

an operator actuatable control for determining a supply of operator commanded pressurized brake fluid to at least one of said vehicle wheel brakes;

first means responsive to operator input to control directly the operator commanded pressurized brake fluid supplied to the one vehicle wheel brake;

second means responsive to operator input to determine commanded wheel deceleration;

means for measuring wheel velocity;

means responsive to measured wheel velocity and for providing a deceleration upper bound on the magnitude of the wheel deceleration;

means for comparing the commanded wheel deceleration and the deceleration upper bound and for selecting the lesser in magnitude; and means responsive to the comparing means and for supplying the operator commanded pressurized brake fluid to said one vehicle wheel brake in the event that the commanded wheel deceleration is selected and for supplying a lesser pressure determined by the deceleration upper bound in the event the deceleration upper bound is selected.

BRIEF DESCRIPTION OF THE DRAWING

Corresponding reference characters indicate corresponding parts throughout the several views of the drawings.

DESCRIPTION OF THE PREFERRED EMBODIMENT

The preferred environment of the present anti-skid system is in aircraft braking where the operator is the pilot and has separate left and right wheel brake control pedals. The system will be described for a single wheel of such an aircraft, it being understood that in the aircraft environment the system may be duplicated for another wheel while in other environments more than one wheel may be under the control of a single pedal or other operator control.

The braking control system is operative when the aircraft or other vehicle is slowing, that is, at negative accelerations. When the term "deceleration" is used herein, it is the negative of acceleration and positive.

Figure 1:
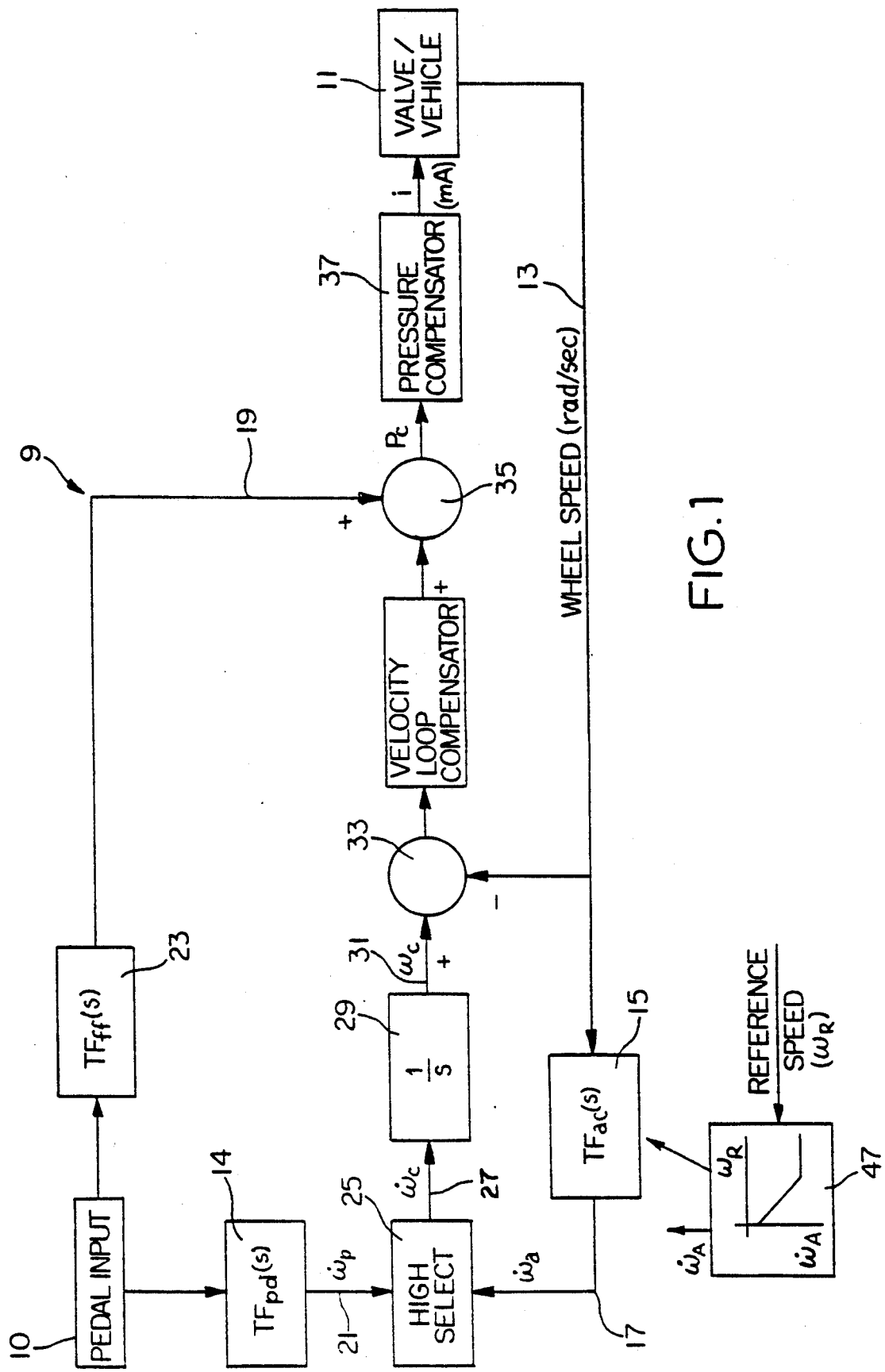
FIG. 1 is a generalized schematic representation of an overall anti-skid brake control system illustrating the present invention in one form.

In FIG. 1, an anti-lock braking system 9 for an aircraft or similar vehicle is shown schematically. The system receives an input angular velocity indicative signal from the wheeled vehicle 11 on line 13. Block 11 represents the vehicle and wheel brake valve thereof. Wheel hubcap mounted permanent magnets and a sensing coil fixed to the axle adjacent the hubcap (not shown) in which a series of pulses are induced as the wheel rotates, or other electromechanical or optical arrangements, may be used. This signal is supplied to transfer function block 15 which may effect a simple linear relationship within certain limits as depicted, or a more complex arithmetic operation or other function such as a table look-up operation, which associates with the input angular velocity on line 13 to provide a corresponding maximum angular acceleration on line 17. The wheeled vehicle 11 has a conventional arrangement for supplying pressurized brake fluid to actuate the associated wheel brakes of the vehicle. There is also a conventional brake pedal or similar operator actuatable control for determining the supply of pressurized brake fluid to at least one vehicle wheel brake. When the pilot or similar vehicle operator depresses the brake pedal, that operator or pedal input 10 controls directly the pressure of the brake fluid supplied to at least one vehicle wheel brake by way of line 19. This feed forward provides a very rapid response (pressure rise). A transfer function 14 also responds to the same operator input to determine the commanded vehicle deceleration transmitted via second line 21. In each case, the actual pedal input 10 is modified by a transfer function 23 or 14 (described later in connection with FIG. 2) to provide the desired signal. The higher acceleration (lesser magnitude deceleration) is selected between those presented on lines 17 and 21 by a high select control circuit 25 the output of which on line 27 is a control angular acceleration. This value is integrated at integrator 29 and a control angular velocity is provided on line 31. The wheel speed on line 13 is compared to this computed control angular velocity at comparator 33, and the operator commanded braking pressure on line 19 is modified at comparator 35 only if the output of comparator 33 indicates a skid is imminent. Pressure compensator 37 is essentially an alternating current coupler which compensates for valve offset and variation among valves to bring the valve back to the appropriate null position.

Figure 2:
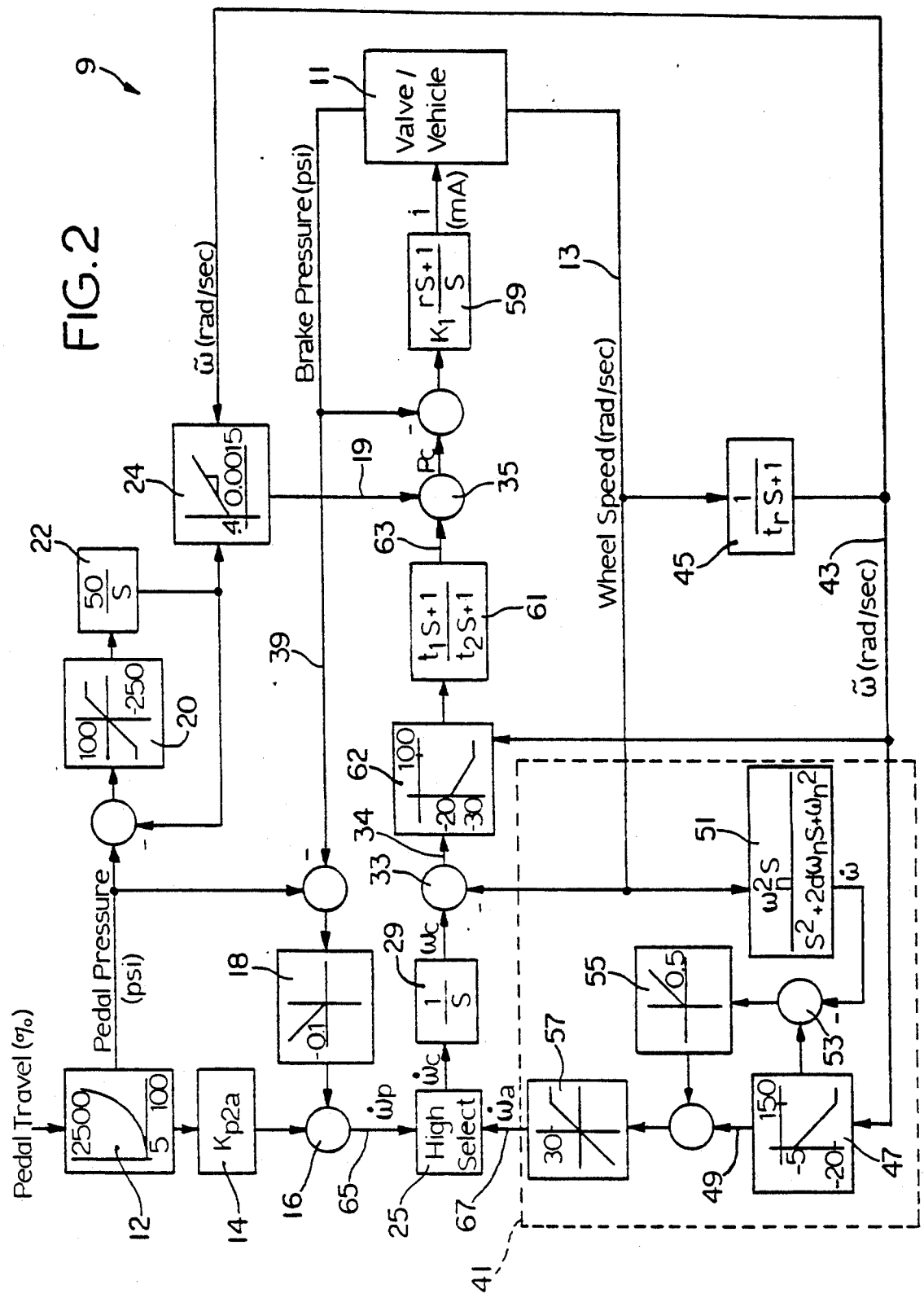
FIG. 2 is a more detailed schematic representation of the system of FIG. 1 emphasizing the functional aspects thereof.

Comparing FIGS. 1 and 2, it will be noted that the operator input as a percentage of total pedal stroke is converted to a pressure value at pedal travel block 12 and that pressure value is modified by a gain factor at block 14. The modified pressure signal is compared to a value operable only during slow speed taxi operation from circuit 18 and the output of the comparison provides the commanded deceleration signal on line 21 (FIG. 1) or 65 (FIG. 2). The commanded brake pressure of block 12 is also supplied to limiter 20 the output of which is integrated at block 22. Thus, the feed forward transfer function 23 of FIG. 1 is implemented in FIG. 2 by an integration with feedback which behaves like a low pass filter. The rate-limited pedal pressure is multiplied by the gain determined by block 24. The block schedules the gain as a function of measured wheel speed. The gain is larger at a higher aircraft speed (i.e. at the beginning of a landing). This gain scheduling provides a quick pressure build up at the initial pedal application.

As seen in greater detail in FIG. 2, the control system actually receives two signals from the vehicle 11. In addition to the wheel angular velocity indicative signal on line 13, a transducer (not shown) provides an indication of actual brake pressure via line 39. The arrangement for providing an upper bound on the magnitude of the vehicle deceleration in response to the measured wheel velocity on line 13 is enclosed in dotted lines 41 and corresponds approximately to the transfer function block 15 of FIG. 1. Circuit 41 receives via line 43, in addition to the angular velocity indicative signal on line 13, a reference speed indicative signal from the first order filter 45. This reference speed signal is supplied to the deceleration schedule circuit 47 which provides on line 49 a determined maximum angular deceleration signal for the particular input speed. Circuit 41 also includes means for calculating the angular deceleration of the wheel from the measured angular velocity on line 13 in the form of a second order filter and differentiator 51. The difference between this computed or calculated angular deceleration and the determined maximum angular deceleration from the schedule circuit 47 is determined at comparator 53. Circuit 55 modifies the determined maximum angular deceleration by a fraction (0.5 as illustrated) of the determined difference only if the determined maximum angular deceleration is greater than the calculated angular deceleration. The fraction of the determined maximum angular deceleration and the scheduled value (determined maximum angular deceleration) from circuit 47 are compared at block 57 and the arithmetic sum is limited to, for example, 30 radians per sec. per sec. by circuit 57. This limited value or deceleration upper bound is compared to the commanded deceleration and the lesser in magnitude of the two values is supplied as the output of the high select circuit 25. Subsequent integration to obtain a velocity value at block 29, comparison with the measured angular velocity at comparator 33 produces a speed error signal 34. The speed error signal 34 is multiplied by variable gain block 62 and lead/lag filter 61 to produce a pressure signal 63. Pressure 63 is sun, ned with pressure 19 to produce pressure command $P_c$. Compensator block 59 acts on or with valve/vehicle 11 to ensure the brake pressure 39 tracks commanded pressure $P_c$.

What is claimed is:

1. In a wheeled vehicle having means for supplying pressurized brake fluid to actuate vehicle wheel brakes of the vehicle, a brake control system for providing anti-skid control comprising:

an operator actuatable control for determining a supply of operator commanded pressurized brake fluid to at least one of said vehicle wheel brakes;

first means responsive to operator input to control directly the operator commanded pressurized brake fluid supplied to the one vehicle wheel brake;

second means responsive to operator input to determine commanded wheel deceleration;

means for measuring wheel velocity;

means responsive to measured wheel velocity and for providing a deceleration upper bound on the magnitude of the wheel deceleration;

means for comparing the commanded wheel deceleration and the deceleration upper bound and for selecting the lesser in magnitude; and means responsive to the comparing means and for supplying the operator commanded pressurized brake fluid to said one vehicle wheel brake in the event that the commanded wheel deceleration is selected and for supplying a lesser pressure determined by the deceleration upper bound in the event the deceleration upper bound is selected.

2. The system of claim 1, wherein the means for providing the deceleration upper bound comprises means for calculating an angular deceleration of a wheel from the measured wheel velocity, means for determining a maximum angular deceleration based on the measured wheel velocity, means for determining the difference between the calculated angular deceleration and the determined maximum angular deceleration, and means for modifying the determined maximum angular deceleration by a fraction of the determined difference only if the determined maximum angular deceleration is greater than the calculated angular deceleration.

3. In a wheeled vehicle having means for supplying pressurized brake fluid to actuate vehicle wheel brakes of the vehicle, a brake control system for providing anti-skid control comprising:
- an operator actuatable brake control for supplying operator commanded pressurized brake fluid to at least one vehicle wheel brake;
- means responsive to the operator actuatable brake control for determining the deceleration commanded by the operator;
- means for dynamically determining a maximum permissible wheel deceleration;
- means for comparing the deceleration commanded by the operator and the maximum permissible wheel deceleration and for selecting the lesser in magnitude of the two decelerations; and
- means responsive to the comparing means and for supplying operator commanded pressurized brake fluid to said one vehicle wheel brake in the event that the deceleration commanded by the operator is selected and for supplying a lesser pressure determined by the maximum permissible wheel deceleration in the event the maximum permissible wheel deceleration is selected.

4. A brake control system for a wheeled vehicle comprising:
- a continuous source of pressurized hydraulic fluid;
- a hydraulically actuated wheel rotation braking device which responds to applied pressurized hydraulic fluid to apply a braking force to a wheel of the vehicle to arrest wheel motion;
- an operator actuatable control for varying the supply of pressurized hydraulic fluid to the wheel rotation braking device;
- means responsive to the operator actuatable control and for determining the deceleration currently commanded by the operator;
- means for dynamically determining a maximum permissible wheel deceleration at a given time; and
- means for overriding the supply of pressurized hydraulic fluid to the wheel rotation braking device in the event that the deceleration commanded by the operator exceeds the maximum permissible wheel deceleration, whereby the braking force is controlled totally by the operator up to the point of an impending skid.

5. The brake control system of claim 4, wherein the dynamic determining means includes means for measuring an angular velocity of the wheel, means for calculating the angular deceleration of the wheel from the measured angular velocity, means for determining a maximum angular deceleration based on the measured angular velocity, means for determining the difference between the calculated angular deceleration and the determined maximum angular deceleration, and means for modifying the determined maximum angular deceleration by a fraction of the determined difference only if the determined maximum angular deceleration is greater than the calculated angular deceleration.

6. A process of monitoring the motion of a vehicle wheel of a vehicle and controlling the application of a hydraulically applied braking force to the wheel, comprising the steps of:
- measuring an angular velocity of the wheel;
- calculating an angular deceleration of the wheel from the measured angular velocity;
- determining a maximum angular deceleration based on the measured angular velocity;
- determining the difference between the calculated angular deceleration and the determined maximum angular deceleration;
- modifying the determined maximum angular deceleration by a fraction of the determined difference only if the determined maximum angular deceleration has a greater valve than the calculated angular deceleration; and
- utilizing one of the modified determined maximum angular deceleration and the determined maximum angular deceleration for determining a limit of application of hydraulically applied braking force to the wheel and said limit used to control the braking force, the determined maximum angular deceleration being utilized if it is less than the calculated angular deceleration and the modified determined maximum angular deceleration being utilized if the determined maximum angular deceleration is greater then the calculated angular deceleration.

7. The process of claim 6, further comprising the step of a vehicle operator commanding a specific deceleration, and the utilizing step further comprising comparing the specific deceleration to one of the determined maximum angular deceleration and modified determined maximum angular deceleration, and limiting actual wheel deceleration to the smaller deceleration of the comparison.

8. The process of claim 6, including the additional steps of a vehicle operator depressing a brake control pedal to control directly the application of the hydraulically applied braking force to the wheel and to provide commanded wheel deceleration, and the utilizing step further comprising comparing the commanded wheel deceleration with one of the determined maximum angular deceleration and modified determined maximum angular deceleration, and limiting actual vehicle deceleration to one of the determined maximum angular deceleration and modified determined maximum angular deceleration in the event the comparison indicates the commanded wheel deceleration is greater and to the commanded wheel deceleration in the event the comparison indicates the selected one of the determined maximum angular deceleration and modified determined maximum angular deceleration is greater, whereby the braking force of the vehicle controlled totally by the operator up to the point of an impending skid.

* * * * *